United States Patent
Kimura

(10) Patent No.: US 6,282,159 B1
(45) Date of Patent: Aug. 28, 2001

(54) DATA RECORDING METHOD AND DEVICE FOR OPTICAL MEMORY CARD CAPABLE OF STOPPING RECORDING UPON DETECTION OF SYNCHRONIZATION ERROR

(75) Inventor: Yasuyuki Kimura, Hiki-gun (JP)

(73) Assignee: Kabushiki Kaisha Nippon Conlux, Tokyo (JP)

( * ) Notice: Subject to any disclaimer, the term of this patent is extended or adjusted under 35 U.S.C. 154(b) by 0 days.

(21) Appl. No.: 09/101,747

(22) PCT Filed: Nov. 10, 1997

(86) PCT No.: PCT/JP97/04082

§ 371 Date: Jul. 10, 1998

§ 102(e) Date: Jul. 10, 1998

(87) PCT Pub. No.: WO98/21721

PCT Pub. Date: May 22, 1998

(30) Foreign Application Priority Data

Nov. 11, 1996 (JP) ........................................ 8-298783

(51) Int. Cl.⁷ ........................................... G11B 5/09
(52) U.S. Cl. ..................... 369/47.14; 369/53.12; 369/53.31
(58) Field of Search ................ 369/47, 48, 54, 369/58, 124, 47.14, 47.15, 47.36, 47.49, 47.5, 47.51, 47.54, 53.12, 53.15, 53.16, 53.17, 53.18, 53.31, 53.32, 53.35, 53.34, 124.07; 360/53

(56) References Cited

U.S. PATENT DOCUMENTS 5,175,655 * 12/1992 Satomura ........................ 360/53

FOREIGN PATENT DOCUMENTS

| 3156775 | 7/1991 | (JP) . |
| 490170 | 3/1992 | (JP) . |
| 4134670 | 5/1992 | (JP) . |
| 2223068 | 9/1992 | (JP) . |

* cited by examiner

Primary Examiner—Paul W. Huber
(74) Attorney, Agent, or Firm—Hogan & Hartson, LLP

(57) ABSTRACT

A data recording method and device for an optical memory card which is adapted to prevent a recording error due to step-out during a data recording operation, and minimize a decrease in the recording capacity of an optical memory card. While data are recorded, an output from an SYNC mark detection circuit (2) and an output from an internal synchronization signal generation circuit (3) are compared with each other in a comparator circuit (4). When step-out occurs, a write signal generation circuit (5) is stopped and the data recording operation is interrupted, and a re-recording operation is started at a frame adjacent to the frame in which a recording error occurred, on the basis of the value in a write cycle counter, whereby a decrease in the recording capacity of the optical memory card is minimized.

16 Claims, 8 Drawing Sheets

DATA RECORDING METHOD AND DEVICE FOR OPTICAL MEMORY CARD CAPABLE OF STOPPING RECORDING UPON DETECTION OF SYNCHRONIZATION ERROR

TECHNICAL FIELD

The invention relates to a method and device for recording data on an optical memory card, and more particularly to a method and device for recording on an optical memory card, in that if a synchronization failure occurs while data is being recorded, data recording operation is stopped to prevent a recording capacity of the optical memory card from being degraded due to a recording error.

BACKGROUND ART

Generally, the optical memory card is a plastic card and can record and read data in its recording region with a laser beam.

FIG. 6 shows a recording region 102 of an optical memory card 101. As shown in its enlarged diagram, data recording tracks 103 for recording information and guide tracks 104 formed at given intervals to control tracking for stabilizing a radiating position of the laser beams for recording and reading are alternately disposed on the recording region 102.

The data recording tracks 103 and the guide tracks 104 have a different reflection ratio. The data recording tracks 103 have a reflection ratio higher than the guide tracks 104 do.

And, a record pit 105 is a portion having a low reflection ratio, which is formed in the data recording tracks 103, with the laser beam when information is recorded. The presence or not of the record pit 105 indicates information recorded.

FIG. 7 shows a logical data structure of the recording region 102. On the recording region 102, in addition to a sector 120 where information is recorded, read-in 121 from which bit synchronization is obtained and an SYNC mark 122 from which frame synchronization is obtained by a non-illustrated optical memory card reader/writer when recording or reading and BOS 123 required for detecting a start position of the sector 120 are recorded.

The read-in 121 has the SYNC mark 122 recorded and record pits 105 formed at recorded intervals.

An optical memory card reader/writer (not shown) is provided with a synchronization signal generator (not shown), scans the optical memory card 101 at a scan rate so that a synchronization signal output from the synchronization signal generator agrees with a signal which rises for every one bit detected by scanning the read-in 121, and keeps the same scan rate to have bit synchronization.

And, a modulation system which includes a synchronization signal into information to be recorded may be adopted to extract the synchronization signal from the signal detected when reading, in order to firmly retain the obtained bit synchronization.

The SYNC mark 122 is formed of record pits 105, which are arranged in a pattern not produced by modulation, and used when the non-illustrated optical memory card reader/writer gets frame synchronization.

The frame is a bit separation to process a signal by a signal processing circuit in the non-illustrated optical memory card reader/writer. The non-illustrated optical memory card reader/writer is provided with a counter (not shown) for obtaining frame synchronization. The counter counts the synchronization signal, outputs a frame synchronization signal after counting up to the number of bits configuring one frame, and resets its counted number.

Since the SYNC mark 122 is recorded at the start end (or termination end) of the frame, the non-illustrated optical memory card reader/writer scans the optical memory card 101. And when the SYNC mark 122 is detected, the number indicated by the non-illustrated counter for obtaining frame synchronization is reset, thereby assuring the acquisition of frame synchronization.

Description will be made of a procedure for recording data on the optical memory card.

A non-illustrated memory card reader/writer scans the optical memory card 101 to obtain bit synchronization by the read-in 121 and frame synchronization by the SYNC mark 122. Then, the non-illustrated optical memory card reader/writer generates a write signal according to data to be recorded and enters the signal into a non-illustrated optical head. The optical head forms a record pit 105 on the data recording track 103 according to the write signal.

After recording all data, the non-illustrated optical memory card reader/writer reads the recorded data to compare it with data to be recorded. If they agree with each other, the recording operation is terminated, but if not, it is determined as recording error, and the recording operation is repeated from the beginning.

The recording error occurs frequently when synchronization between a card carrying velocity and an electric circuit (bit synchronization, frame synchronization) is lost due to interference such as vibrations on the non-illustrated optical memory card reader/writer during the recording operation.

FIG. 8 shows an example of the record pit 105 which is formed on the data recording track 103 if synchronization is lost.

In FIG. 8, a data recording track 103-1 has the record pits 105 formed normally, but a data recording track 103-2 has the record pits 105 formed with irregular intervals and some of them are overlaid with the SYNC marks 122 because synchronization was lost.

Data recorded on the data recording track 103-2 is not read normally. Therefore, it is rerecorded on another data recording track 103.

However, the data recording method described above cannot rerecord data on the portion where a recording error has occurred, resulting in a disadvantage that the recording capacity of the optical memory card as the whole is lowered.

SUMMARY OF THE INVENTION

Under the circumstances as described above, it is an object of the invention to provide a data recording method and device for an optical memory card, which detects an occurrence of out-of-synchronization during recording operation and stops the recording operation to minimize a reduction in recording capacity due to a recording error.

To achieve the above object, the invention provides a data recording method for an optical memory card, which comprises detecting synchronization during data recording and stopping data recording and rerecording based on the detected result, wherein a synchronization signal, generated when a mark for detecting synchronization recorded on the optical memory card is detected, is compared with an internal synchronization signal which is generated by a data recording device, and according to the compared result, it is judged whether the synchronization is normal or not, and if the synchronization is abnormal, data recording is stopped.

If the synchronization detection mark cannot be detected, the judgment on whether the synchronization is normal or not is delayed until the synchronization detection mark is detected.

If the data recording is stopped, rerecording of the data is started from a frame adjacent to the frame where the data recording was stopped, based on a write cycle counted during the data recording.

The data recorded in the adjacent frame may be data which was being recorded into the frame where the data recording was stopped.

Also, the invention provides a data recording device for an optical memory card, which detects synchronization during data recording, stops data recording and rerecords based on the detected result, and comprises:

mark detecting means for detecting a mark for detecting synchronization recorded on the optical memory card;

synchronization signal generating means for generating a synchronization signal based on the mark for detecting synchronization detected by the mark detecting means;

internal synchronization signal generating means for generating an internal synchronization signal;

comparison means for comparing the synchronization signal generated by the synchronization signal generating means with the internal synchronization signal generated by the internal synchronization signal generating means to judge whether the synchronization is normal or not;

data recording stopping means for stopping the data recording according to the compared result obtained by the comparing means; and rerecording start position deciding means for deciding a rerecording start position when the data recording is stopped by the data recording stopping means.

If the synchronization detecting mark cannot be detected, the comparing means delays making judgment, whether the synchronization is normal or not, until the synchronization detecting mark is detected.

And, the rerecording start position deciding means includes counter means for counting a write cycle during data recording; and write cycle retaining means for retaining the write cycle when the data recording is stopped.

The rerecording start position deciding means further includes a rerecording start data deciding means for starting the rerecording from the data which was being recorded in the write cycle when the data recording was stopped.

BEST MODE FOR CARRYING OUT THE INVENTION

A data recording method and device for an optical memory card according to the invention will be described with reference to the accompanying drawings.

Figure 1:
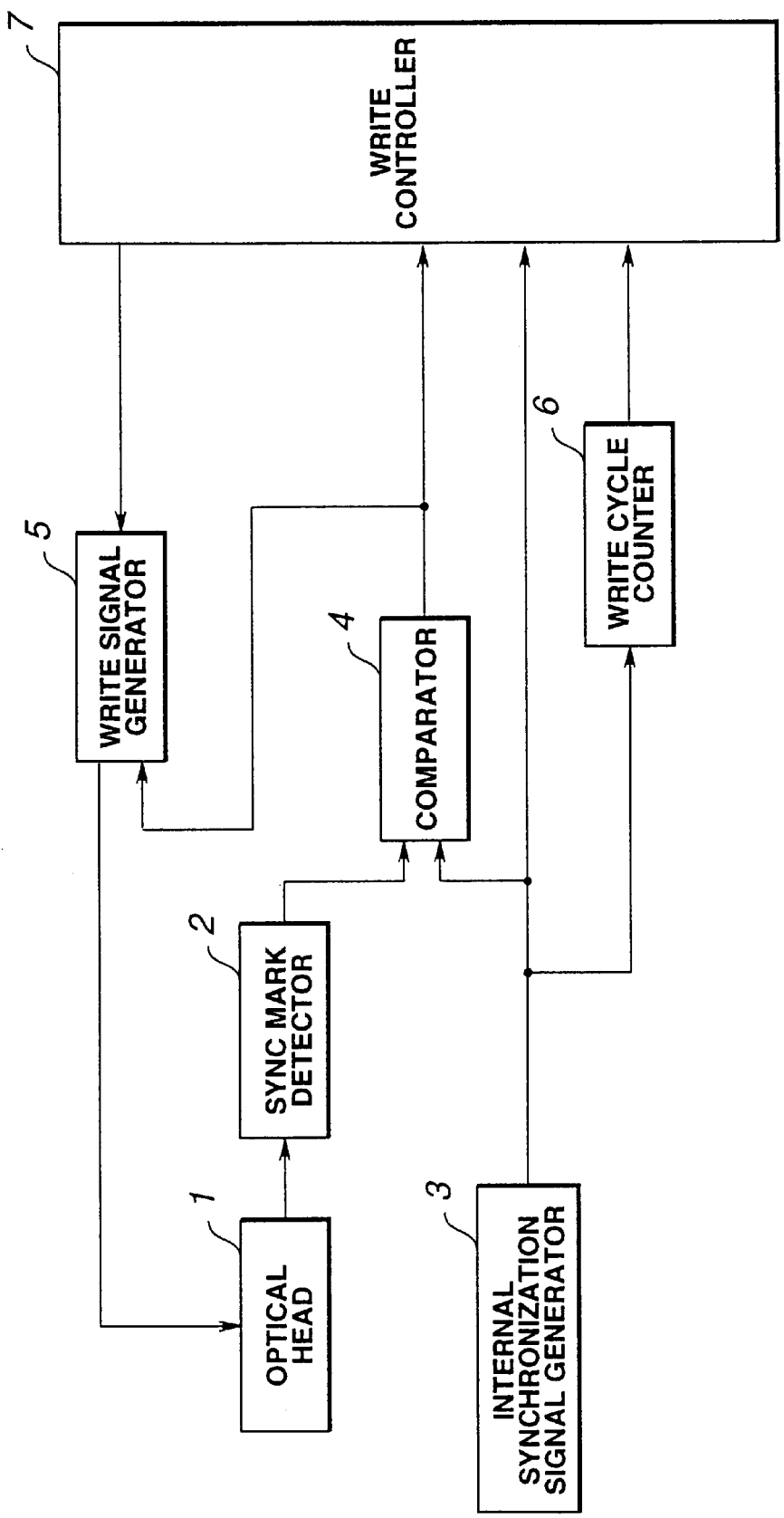
FIG. 1 is a block diagram showing an embodiment of a data recording method and device for an optical memory card according to the invention.

FIG. 1 is a block diagram showing an embodiment of a data recording method and device for an optical memory card according to the invention.

In FIG. 1, when a non-illustrated optical memory card is inserted into a non-illustrated optical memory card reader/writer, the optical memory card reader/writer starts to record data and moves the optical memory card back and forth.

An optical head 1 scans a recording region of the optical memory card, and the detected output is put in an SYNC mark detecting circuit 2.

The SYNC mark detecting circuit 2 generates an SYNC mark detection signal, which produces a pulse upon detecting an SYNC mark, and enters it into a comparison circuit 4.

An internal synchronization signal (frame synchronization signal) produced by an internal synchronization signal generating circuit 3 is entered into the comparison circuit 4, where it is detected whether the SYNC mark detection signal agrees with the internal synchronization signal, and if it does, it is judged that a card conveying rate has been synchronized with an electric circuit, and a synchronization lock signal is entered into a write signal generating circuit 5 and a write control circuit 7.

According to a data signal output from the write control circuit 7 and a synchronization lock signal output from the comparison circuit 4, the write signal generating circuit 5 enters a signal for forming a record pit on the non-illustrated optical memory card into the optical head 1.

And, a write cycle counter 6 counts a write cycle based on an internal synchronization signal output from the internal synchronization signal generating circuit 3 and outputs a write cycle signal to a write control circuit 7.

Figure 2:
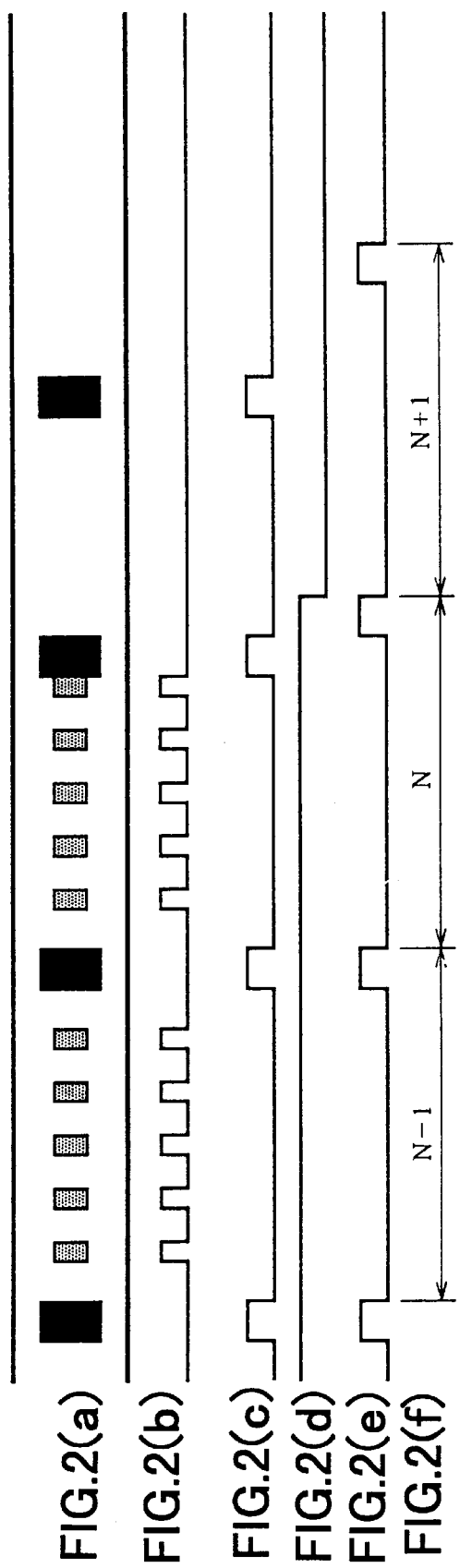
FIG. 2(a) to 2(f) are diagrams showing record pit-forming positions and respective signals when a synchronization failure has occurred during data recording.

FIG. 2 is a diagram showing record pit-formed positions and respective signals when a synchronization failure has occurred during data recording. FIG. 2 (a) shows positions of record pits on the optical memory card, FIG. 2 (b) a write signal, FIG. 2 (c) an SYNC mark detecting signal, FIG. 2 (d) a synchronization lock signal, FIG. 2 (e) an internal lock signal, and FIG. 2 (f) a write cycle.

In FIG. 2, it is assumed that a synchronization failure has occurred due to interference such as vibrations while data is being recorded in a frame with a write cycle N.

Up to a write cycle N−1 where synchronization is normal, the SYNC mark detection signal (see FIG. 2 (c)) output from the SYNC mark detection circuit 2 and the internal synchronization signal (see FIG. 2 (e) generated from the internal synchronization signal generating circuit 3 have the same pulse position. Accordingly, the synchronization lock signal (see FIG. 2 (d)) generated by the comparison circuit 4 is in a lock state indicating that synchronization has been made.

And, since the synchronization signal is in the lock state, the write signal generation circuit 5 outputs a write signal (see FIG. 2 (b)) for generating a pulse at a position where a record pit is formed according to the control made by the write control circuit 7, and based on the write signal, the optical head 1 forms the record pits on the optical memory card.

If a synchronization failure occurs in the write cycle N, the synchronization lock signal produced by the comparison circuit 4 falls in an unlock state indicating that the synchronization has been lost, because the SYNC mark detection signal and the internal synchronization signal have a different pulse generation position.

When the synchronization lock signal indicating the unlock state is entered into the write signal generation circuit 5, the write signal generation circuit 5 stops the generation of the write signal, thereby stopping formation of the record pit (data recording).

Figure 3:
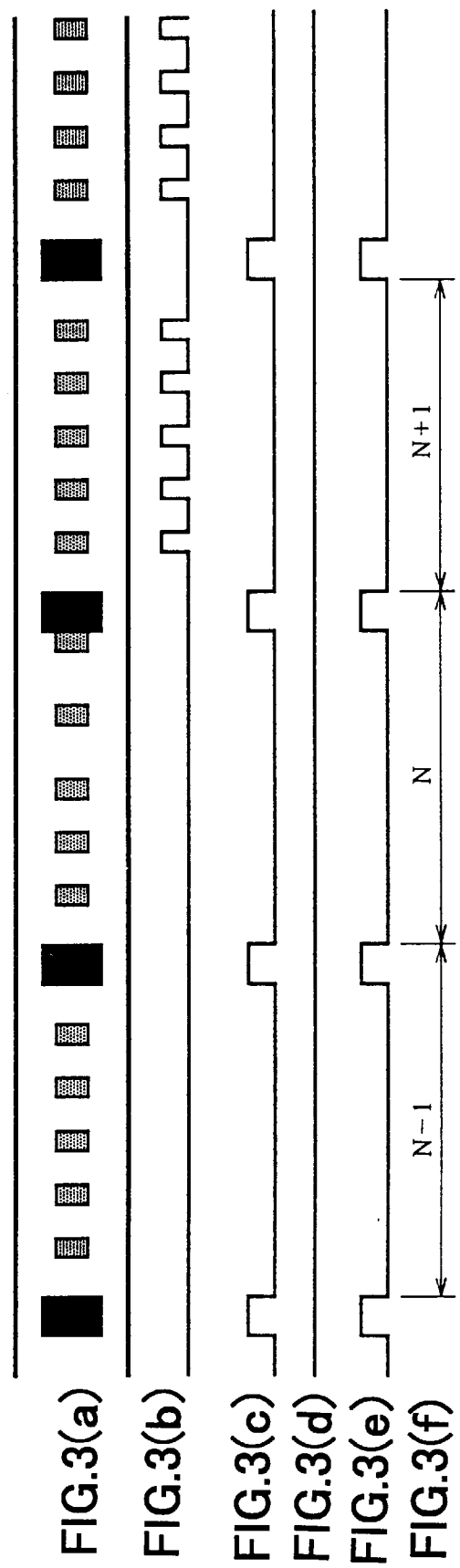
FIG. 3(a) to 3(f) are diagrams showing respective signals during rewrite operation performed immediately after stopping writing in the write cycle N shown in FIG. 2.

FIG. 3 is a diagram showing respective signals during rewrite operation performed immediately after stopping writing in the write cycle N shown in FIG. 2. FIG. 3 (a) through FIG. 3 (f) correspond to FIG. 2 (a) through FIG. 2 (f), respectively.

The rewrite operation prevents the recording capacity of the optical memory card from being degraded, so that recording of data is started from a frame next to the frame which has caused a recording error due to the synchronization failure, namely from a write cycle N+1.

As shown in FIG. 3 (b), when the optical head 1 which has started to rewrite comes up to the frame with the write cycle N+1 and the synchronization lock signal indicates a lock state, the write signal is generated. And, based on the write signal, the optical head 1 forms a record pit on the optical memory card. At this time, data recorded in the frame with the write cycle N+1 is one which was being recorded in the frame with the write cycle N stopped from writing, then recording of data is conducted continuously. Data to be recorded in the frame with the write cycle N+1 may be rerecorded from the first of all data.

Figure 4:
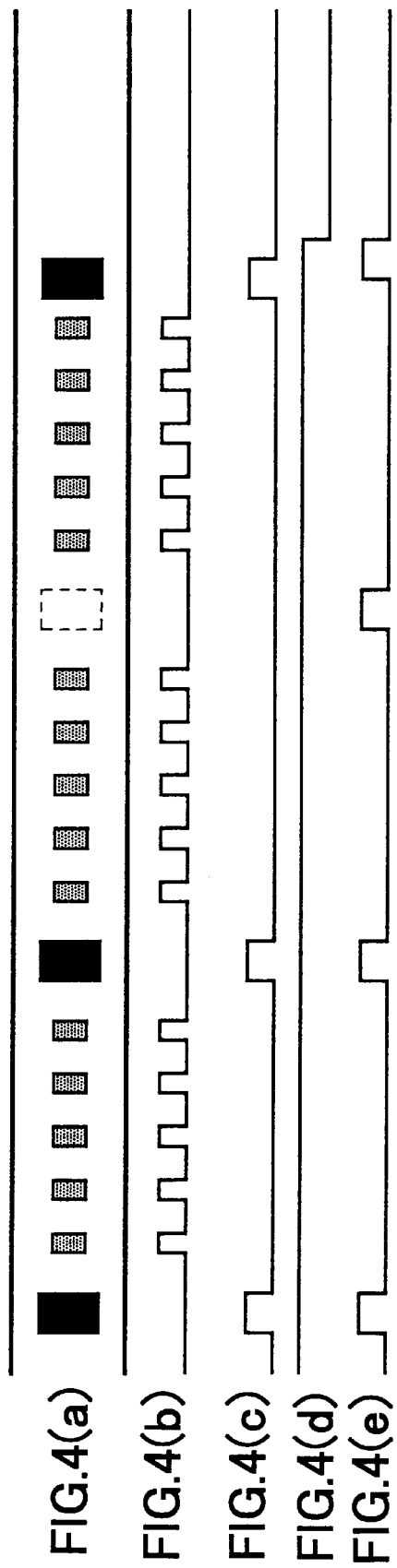
FIG. 4(a) to 4(e) are diagrams showing an example of record with an SYNC mark lost due to dust, a scratch or the like on a recording region of an optical memory card.

FIG. 4 is a diagram showing an example of record with an SYNC mark lost (including undetectable) due to dust, a scratch or the like on a recording region of an optical memory card. FIG. 4 (a) through FIG. 4 (e) correspond to FIG. 2 (a) through FIG. 2 (e), respectively.

If the SYNC mark is lost due to dust, a scratch or the like on the recording region of the optical memory card, the SYNC mark can not be detected by the SYNC mark detection circuit 2. Therefore, the SYNC mark detection signal does not include a pulse as shown in FIG. 4 (c).

Accordingly, the SYNC mark detection signal does not agree with the internal synchronization signal, and the synchronization lock signal output from the comparison circuit 4 indicates an unlock state.

However, if synchronization is normal even when the SYNC mark has been lost, the record pit is marked at a proper position. And, the synchronization lock signal falls in an unlock state to stop recording of data, and the recording capacity of the optical memory card is lowered.

Therefore, the comparison circuit 4 outputs a synchronization lock signal indicating the lock state even if the SYNC mark is not detected as shown in FIG. 4 (c) through FIG. 4 (e), and when the SYNC mark is detected, it is judged whether the synchronization is normal or not.

In other words, the comparison circuit 4 outputs the synchronization lock signal in the unlock state to stop recording of data only when the SYNC mark detection signal having an apparent synchronization failure and the internal synchronization signal have a different pulse position.

Figure 5:
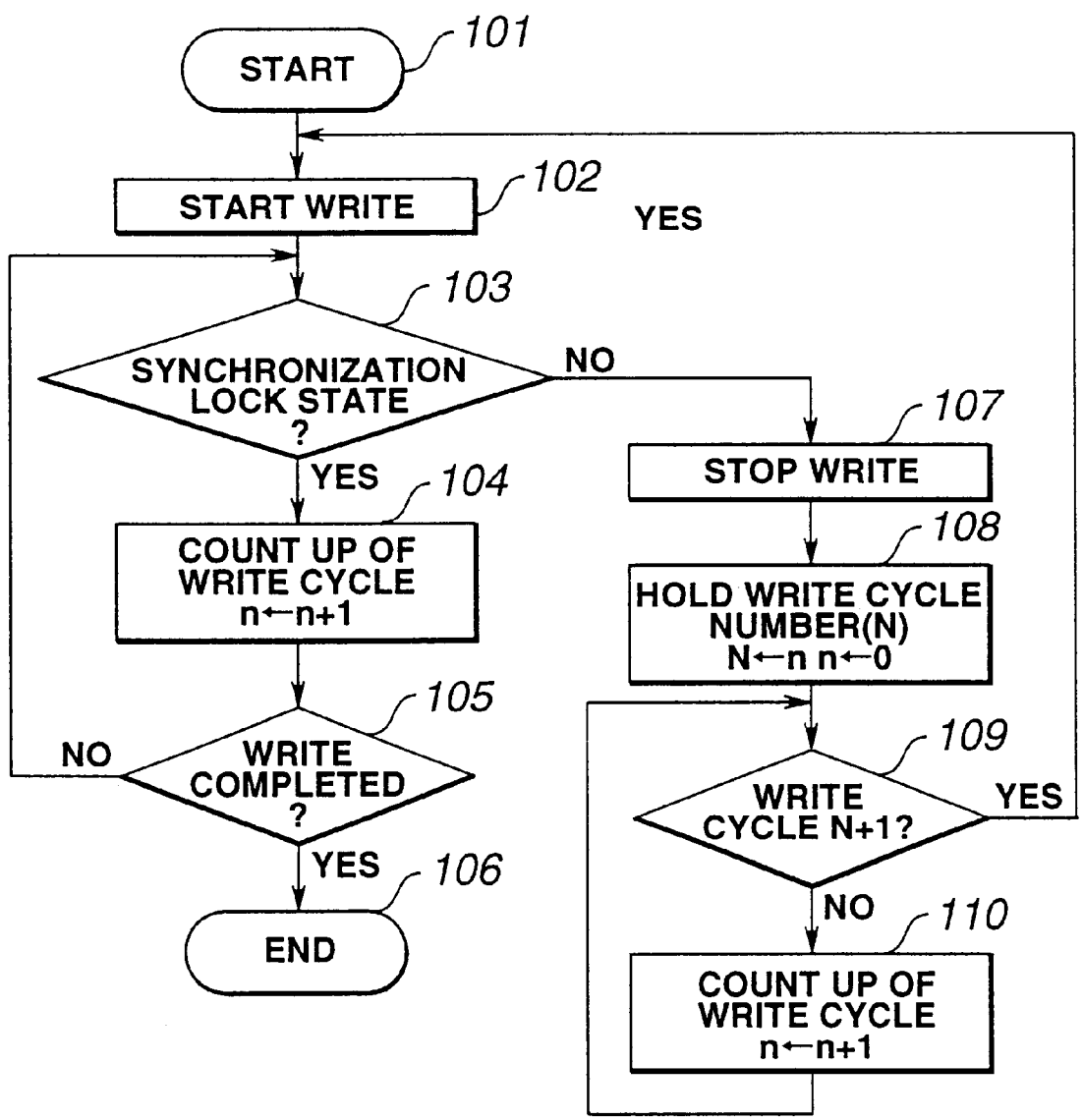
FIG. 5 is a flowchart showing details of signal processing in the embodiment shown in FIG. 1.
Figure 6:
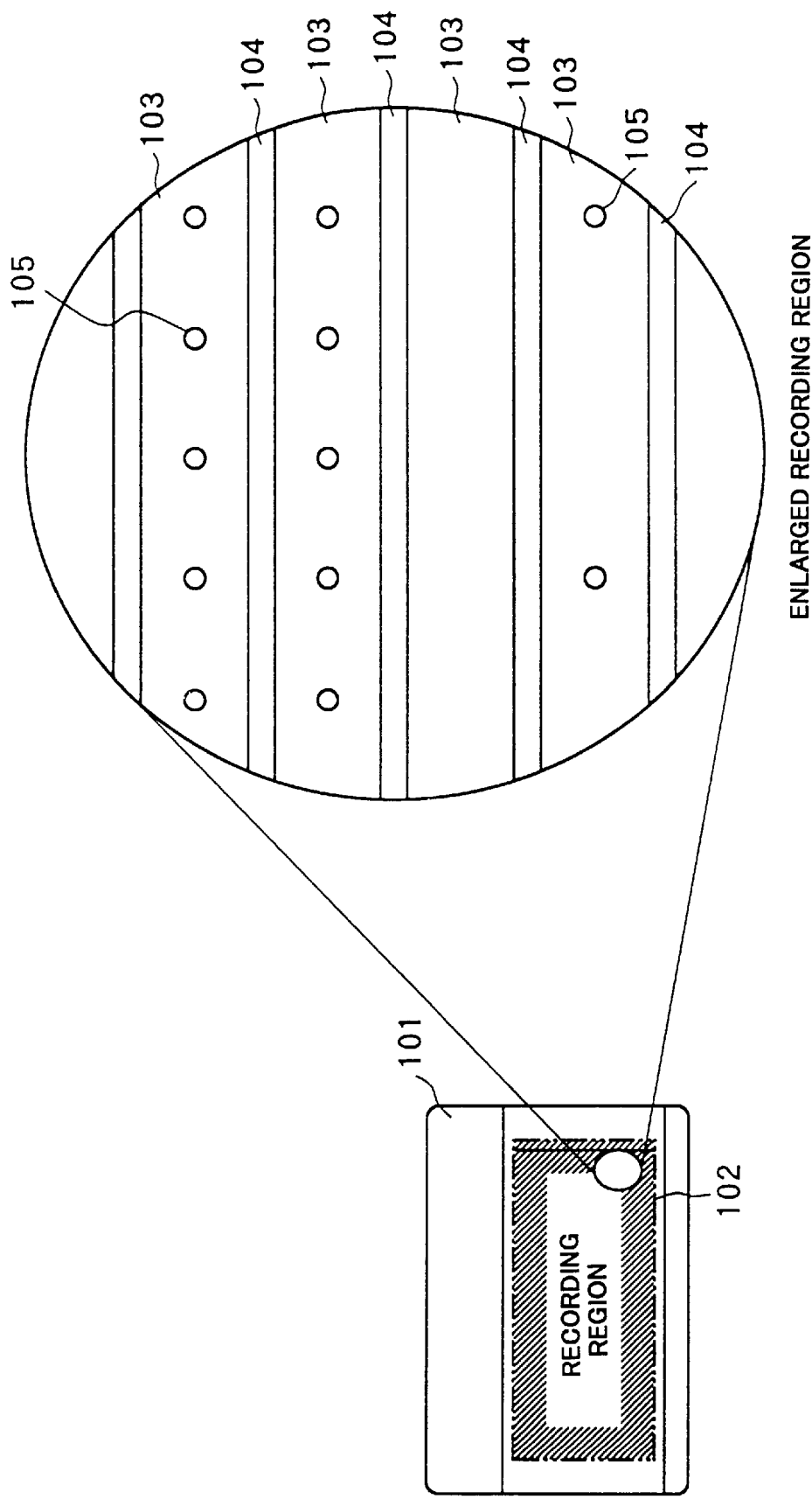
FIG. 6 is a diagram showing a recording region of an optical memory card.
Figure 7:
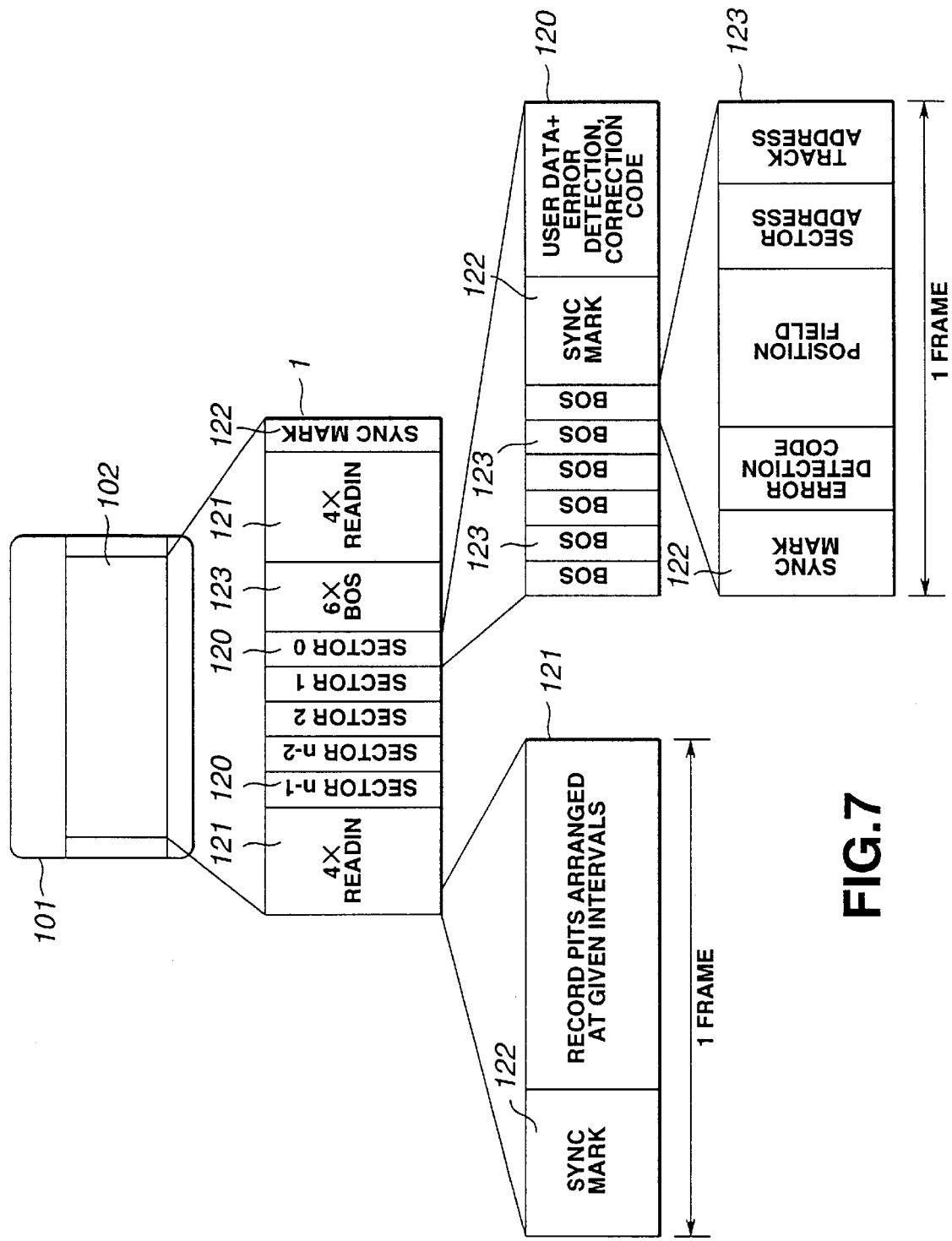
FIG. 7 is a diagram showing a logical data structure in a recording region of an optical memory card.
Figure 8:
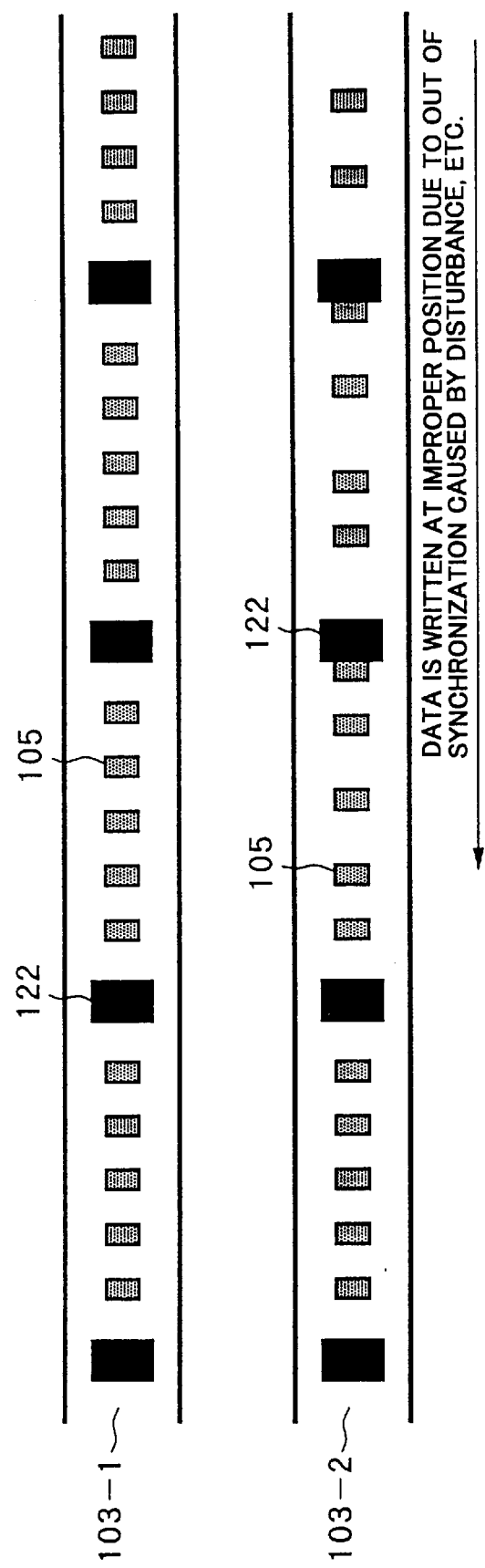
FIG. 8 is a diagram showing an example of a record pit formed on a data recording track if synchronization is lost.

FIG. 5 is a flowchart showing details of signal processing in the embodiment shown in FIG. 1.

It is seen in FIG. 5 that an unillustrated optical memory card reader/writer starts write operation (step 101), and when the synchronization lock signal output from the comparison circuit 4 indicates a synchronization lock state, the optical head 1 forms a record pit on the unillustrated optical memory card based on the write signal output from the write signal generation circuit 5 (step 102).

While the synchronization lock signal indicates the synchronization lock state (YES in step 103), recording of data on the unillustrated optical memory card is continued, and the write cycle counter 6 counts rising edges of the internal synchronization signal and increases write cycle number n for each cycle of the internal synchronization signal (step 104).

Operation from step 103 is repeated until all data is recorded (No in step 105).

Upon recording of all data (YES in step 105), the unillustrated optical memory card reader/writer terminates the write operation.

When synchronization is lost during the write operation and it is indicated that the synchronization lock signal is in a synchronization unlock state (NO in step 103), the write signal generation circuit 5 stops the write signal (step 107), the value of write cycle number n is retained as an out-of-synchronization write cycle N (step 108), and rewrite operation is started.

To prevent the capacity of the optical memory card from being lowered, the rewrite operation starts recording from a frame with write cycle number N+1 adjacent to the frame with write cycle number N where a record error has occurred due to out-of-synchronization. Therefore, the card is carried until write cycle number n becomes N+1 (NO in step 109) to increase write cycle number n for every cycle of an internal synchronization signal (step 110).

When write cycle number n becomes N+1 (YES in step 109), the step returns to step 102 to restart the write operation, and a record pit is formed on the optical memory card.

INDUSTRIAL APPLICABILITY

The invention can be applied to a data recording method and device for an optical memory card. The invention is configured to compare a synchronization signal, which is obtained by detecting an SYNC mark during data recording, with an internal synchronization signal, which is generated in a card reader/writer, and if synchronization is lost, to stop data recording, and to restart data recording from a frame adjacent to the frame which has caused a data recording error. Thus, a recording capacity of the optical memory card can be prevented from being lowered.

And, the data recorded in the frame which has caused the data recording error is corrected based on an error correction code which was recorded together with the data on the optical memory card, so that it is not necessary to rerecord data, and a data recording region of the optical memory card can be used effectively.

What is claimed is:

1. A data recording method for an optical memory card, comprising detecting synchronization during data recording and stopping data recording and rerecording based on the detected result, wherein a synchronization signal, generated when a mark for detecting synchronization recorded in the optical memory card is detected, is compared with an internal synchronization signal which is generated by a data recording device, and according to the compared result, it is judged whether the synchronization is normal or not, and if the synchronization is abnormal, data recording is stopped.

2. The data recording method for an optical memory card according to claim 1, wherein if the synchronization detection mark cannot be detected, the judgment on whether the synchronization is normal or not is delayed until the synchronization detection mark is detected.

3. The data recording method for an optical memory card according to claim 1, wherein if the data recording is stopped, rerecording of the data is started from a frame adjacent to a frame where the data recording was stopped, based on a write cycle counted during the data recording.

4. The data recording method for an optical memory card according to claim 3, wherein the data recorded in the adjacent frame is data which was being recorded into the frame where the data recording was stopped.

5. A data recording device for an optical memory card, which detects synchronization during data recording, stops data recording and rerecords based on a detected result, comprising:

mark detecting means for detecting a mark for detecting synchronization recorded on the optical memory card;

synchronization signal generating means for generating a synchronization signal based on the mark for detecting synchronization detected by the mark detecting means;

internal synchronization signal generating means for generating an internal synchronization signal;

comparison means for comparing the synchronization signal generated by the synchronization signal generating means with the internal synchronization signal generated by the internal synchronization signal generating means to judge whether the synchronization is normal or not;

data recording stopping means for stopping the data recording according to the compared result obtained by the comparing means; and rerecording start position deciding means for deciding a rerecording start position when the data recording is stopped by the data recording stopping means.

6. The data recording device for an optical memory card according to claim 5, wherein if the synchronization detecting mark cannot be detected, the comparing means delays making judgment of whether the synchronization is normal or not until the synchronization detecting mark is detected.

7. The data recording device for an optical memory card according to claim 5, wherein the rerecording start position deciding means includes:

counter means for counting a write cycle during data recording; and write cycle retaining means for retaining the write cycle when the data recording is stopped.

8. The data recording device for an optical memory card according to claim 7, wherein the rerecording start position deciding means further includes rerecording start data deciding means for starting the rerecording from the data which was being recorded in the write cycle when the data recording was stopped.

9. A data recording method for an optical memory card in which a mark for detecting synchronization has been recorded beforehand in correspondence with a data recording frame, comprising:

generating a synchronization signal by detecting the mark for detecting synchronization from the optical memory card;

comparing the synchronization signal with an internal synchronization signal which is generated by a data recording device;

judging whether the synchronization is normal or abnormal based on the compared result and, if the synchronization is abnormal, immediately stopping the data recording; and thereafter restarting the date recording from a frame adjacent to a frame where the abnormal synchronization has occurred.

10. The data recording method for an optical memory card according to claim 9, wherein, if the mark for detecting synchronization cannot be detected, the judgment on whether the synchronization is normal or abnormal is delayed until the mark is detected.

11. The data recording method for an optical memory card according to claim 9, wherein, if the data recording is stopped, a frame where the data recording is stopped is detected, based on a write cycle counted during the data recording, and the data rerecording is restarted from a frame adjacent to the detected frame.

12. The data recording method for an optical memory card according to claim 11, wherein the data recorded in the adjacent frame is data which was being recorded into the frame where the data recording was stopped.

13. A data recording device for an optical memory card in which a mark for detecting synchronization has been recorded beforehand in correspondence with a data recording frame, comprising:

mark detecting means for detecting the mark for detecting synchronization from the optical memory card;

synchronization signal generating means for generating a synchronization signal based on the mark for detecting synchronization detected by the mark detecting means;

internal synchronization signal generating means for generating an internal synchronization signal;

comparison means for comparing the synchronization signal generated by the synchronization signal generating means with the internal synchronization signal generated by the internal synchronization signal generating means to judge whether the synchronization is normal or abnormal;

data recording stopping means for stopping the data recording according to the compared result obtained by the comparing means; and rerecording start position deciding means for deciding a rerecording start position of data when the data recording is stopped by the data recording stopping means.

14. The data recording device for an optical memory card according to claim 13, wherein, if the mark for detecting synchronization cannot be detected, the comparing means delays making judgment of whether the synchronization is normal or abnormal until the mark is detected.

15. The data recording device for an optical memory card according to claim 13, wherein the rerecording start position deciding means includes:

counter means for counting a write cycle during data recording; and write cycle retaining means for retaining the write cycle when the data recording is stopped.

16. The data recording device for an optical memory card according to claim 15, wherein the rerecording start position deciding means restart the data recording from the data which was being recorded in the write cycle when the data recording was stopped.

* * * * *